United States Patent [19]
Reinhardt

[11] Patent Number: 6,062,315
[45] Date of Patent: May 16, 2000

[54] DOWNHOLE TOOL MOTOR

[76] Inventor: Paul A. Reinhardt, 12415 Huntingwick, Houston, Tex. 77024

[21] Appl. No.: 09/019,569

[22] Filed: Feb. 6, 1998

[51] Int. Cl.[7] ................................................... E21B 23/00
[52] U.S. Cl. ........................................... 166/381; 166/206
[58] Field of Search .................................... 166/381, 382, 166/206, 214

[56] References Cited

U.S. PATENT DOCUMENTS

| | | | |
|---|---|---|---|
| 3,565,189 | 2/1971 | Hart ............................................. | 175/24 |
| 4,515,213 | 5/1985 | Rogen et al. ............................. | 166/123 |
| 5,318,122 | 6/1994 | Murray et al. ............................ | 166/313 |

Primary Examiner—Frank Tsay
Attorney, Agent, or Firm—Madan, Mossman & Sriram

[57] ABSTRACT

An apparatus and method for transporting a downhole tool in a borehole. A phase change material such as a shape memory metal is activated to engage the borehole and to transport the tool through the borehole. After the tool has been advanced in the borehole, the phase change material is deactivated to release from the borehole wall, and advances into position to continue the transport process. An extension can be engaged with the phase change material to extend the movement range of the phase change material. The phase change material actuator requires few moving parts and can be integrated with other tool components. The invention can operate in opposite directions within a borehole and can replace wellbore tractors and other locomotive tools.

18 Claims, 3 Drawing Sheets

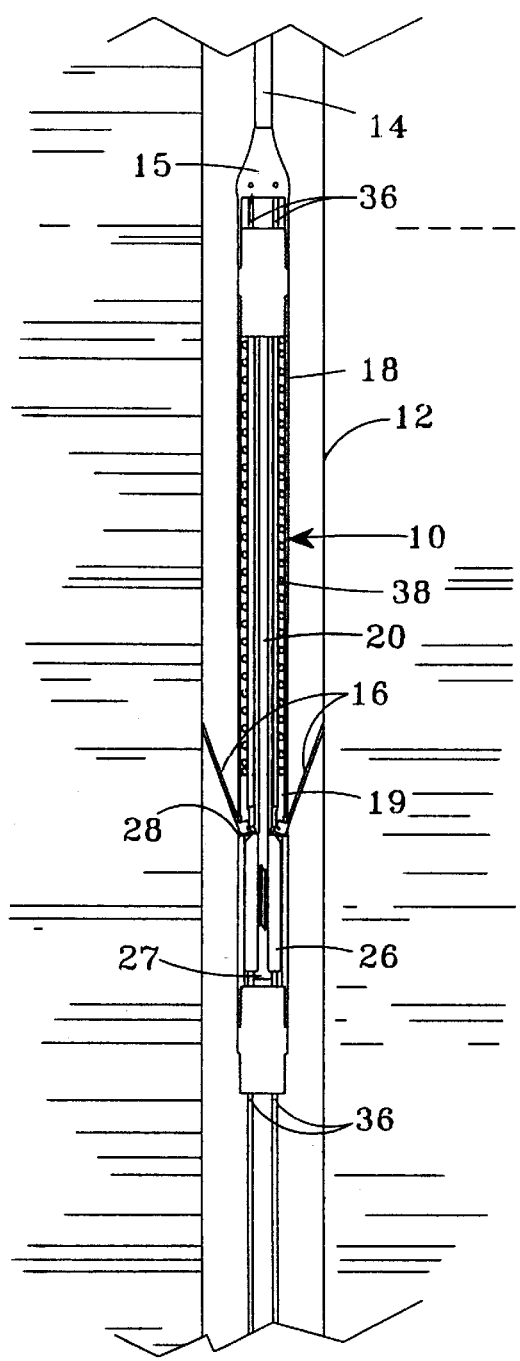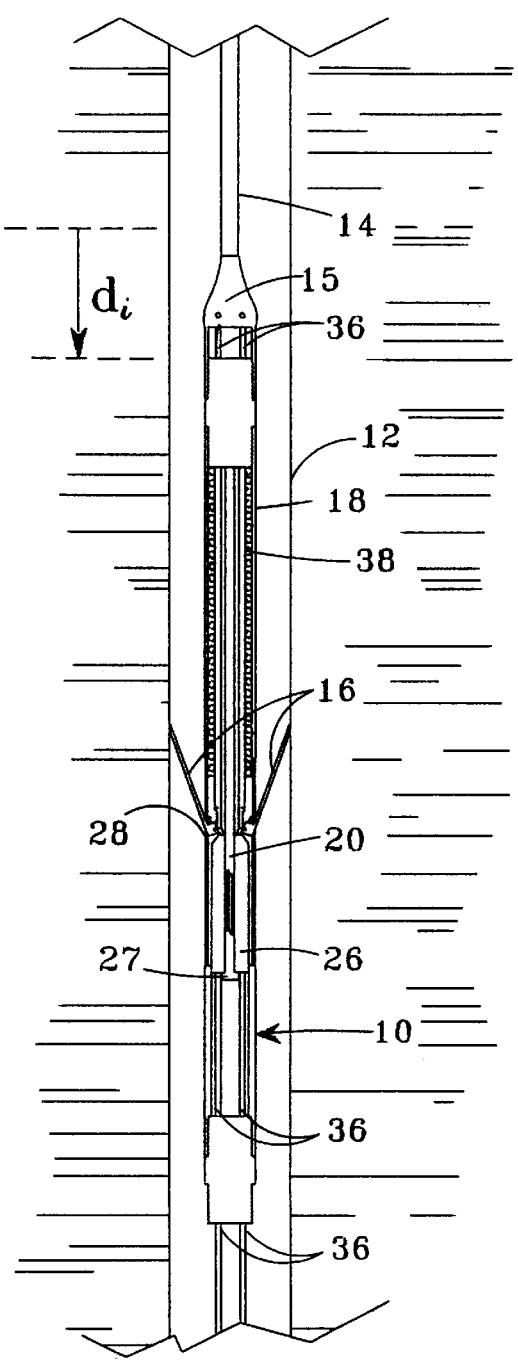

DOWNHOLE TOOL MOTOR

BACKGROUND OF THE INVENTION

The present invention relates to the field of tools run downhole in a borehole. More particularly, the invention relates to an apparatus for transporting a tool downhole through a borehole, and is particularly applicable to deviated and to horizontal boreholes.

Tools are run downhole through boreholes to perform various functions and to identify data relevant to subsurface geologic formations and entrained hydrocarbons. For example, logging tools are run in boreholes to determine the orientation, structure and composition of the borehole and subsurface geologic formations, and to identify the presence of hydrocarbons within the geologic formations. To prevent such tools from becoming stuck within a borehole, such tools are typically run "slick" with a lubricating fluid such as a drilling mud. However, lubricating fluid reduces log quality by interfering with the detection signals generated and received by downhole logging tools.

Roller type "tractors" have been developed to transport tubing and tools downhole through horizontal and deviated wells. Such tractors require multiple moving parts and motors powered with electricity or hydraulic fluid lines. The reliability of downhole tractors is relatively unproven, particularly in uncased boreholes containing fluids. Downhole tractors are relatively expensive and difficult to operate, draw large amounts of power, and have multiple moving parts requiring seals and other maintenance.

Advanced drilling techniques and new completion procedures have increased the complexity of downhole boreholes. Multilateral and horizontal completions shorten the turning radius in deviated wellbores and in the transition between connecting borehole sections. Such boreholes require compact tools which are maneuverable through tight borehole turns and intersections. To navigate narrow boreholes, new tool designs must be smaller than conventional systems. However, the systems must be smaller without reducing the data acquisition and processing capabilities of the tool. Improved downhole tools should preferably be capable of carrying increased instrumentation capabilities and high resolution equipment.

Materials such as shape memory alloys ("SMA") provide actuators for different applications, however SMAs are not conventionally used downhole in boreholes because of operating temperature limitations and useful movement range limitations. SMAs comprise special alloys having the ability to transform from a relatively hard, austenitic phase at high temperature to a relatively flexible, martensitic phase at a lower temperature. SMAs comprise highly thermally sensitive elements which can be heated directly or indirectly to deform the SMA, and can be produced with one-way or two-way memory. An electrical current can resistively heat the SMA to a phase activation threshold temperature by the application of a small electric current through contact leads. Alloy materials providing SMA characteristics include titanium/nickel, copper/zinc/aluminum, and copper/aluminum/nickel compositions.

An SMA in a wire form has two states separated only by temperature. When cool, the SMA is in the martensitic state where the wire is relatively soft and easily deformable. When warmed above the activation temperature, the SMA wire is transformed into the austenitic state wherein the wire is stronger, stiffer and shorter than in the martensitic state. In the martensitic state, an SMA wire is deformed under a relatively low load. When heated above the activation temperature, the SMA wire remembers the original shape and tends to return to such shape. As the SMA wire is heated and contracts, internal stresses opposing the original deformation are created so that the SMA wire can perform work when it returns to the martensitic phase. SMA actuators can use SMA wire in tension as a straight wire or in torsion as a helical wire coil.

The SMA phase transition occurs at a temperature known as the activation temperature. In the low temperature martensitic phase below the activation temperature, the SMA is relatively soft and has a Young's modulus of 3000 Mpa. After the SMA is heated above the activation temperature, the phase transition to a relatively hard austenite phase has a Young's modulus of 6,900 Mpa. If the SMA is not overly deformed or strained, the SMA will return to the original, memorized shape. If the SMA is then cooled, the SMA mechanically deforms to the original martensitic phase. In an SMA formed as a coil spring, heating of the SMA shortens the spring, and cooling the SMA permits the SMA to return to the longer original configuration.

During the manufacture of an SMA, the SMA material is annealed at high temperature to define the structure in the parent, austenitic phase. Upon cooling, the SMA will automatically deflect away from the programmed shape to the configuration assumed by the SMA in the martensitic phase. The SMA can then be alternately heated or cooled with conductive or internal resistance heating techniques to convert the SMA between the austenitic and martensitic phase structures.

As the SMA is heated and cooled, the SMA structurally deflects up to 5%. This deflection can be harnessed with mechanical linkages to perform different work. Although 5% deflection provides a relatively small range of motion, the recovery force can provide forces in excess of 35 to 60 tons per square inch for linear contractions. The rate of mechanical deformation depends of the rate of heating and cooling. In conventional applications, the SMA can be mechanically returned by a restoring force to the configuration of the martensitic shape. This use of a restoring force impacts the geometry and size of mechanisms proposed for a particular use.

SMA materials can be formed into different shapes and configurations by physically constraining the element as the element is heated to the annealing temperature. SMA alloys are available in wire, sheet and tube forms and can be designed to function at different activation temperatures. Large SMAs require relatively high electric current to provide the necessary heating, and correspondingly large electrical conductors to provide high electric current.

Although SMAs are not used downhole in wells because of the limitations described above, SMAs are used in medical devices, seals, eyeglasses, couplings, springs, actuators, and switches. Typically, SMA devices have a single SMA member deformable by heating and have a bias spring for returning the SMA to the original position when cooled. Other actuators termed "differential type actuators" are connected in series so that heating of one SMA deforms the other, and heating of the other SMA works against the first SMA. Representative uses of SMAs are described below.

U.S. Pat. No. 4,556,934 to Lemme et al. (1985) disclosed a shape memory actuator having an end fitting thickness forty percent of the original thickness. The end thickness was reduced so that less current through the end section was required to raise the end temperature above the activation temperature, and the end was cold rolled to strengthen such end against failure.

In U.S. Pat. No. 4,899,543 to Romanelli et al. (1990), a pre-tensioned shape memory actuator provided a clamping device for compressing an object. The actuator comprised a two-way shape memory alloy pre-tensioned to a selected position, and then partially compressed to an intermediate position. The actuator shortened when heated, and then returned to the intermediate clamping position when cooled. The shape memory actuator was formed as a clamping ring or as a coiled spring to accomplish the selected clamping motion.

U.S. Pat. No. 5,127,228 to Swenson (1992) described a shape memory actuator having two concentric tubular shape memory alloy members operated with separate heaters. The torsioned members were engaged at one end so that actuation of one element performed work on the other element, thereby providing a torque density higher than that provided by electromechanical, pneumatic or hydraulic actuators.

U.S. Pat. Nos. 4,979,672 (1990) and 5,071,064 (1991) to AbuJudom et al. disclosed two shape memory alloy elements in the form of a coil spring for operating a damper plate. An electrically conductive rotational connector connected each shape memory element to a control unit and to a stationary member. Each shape memory element was incrementally heated to move a damper plate into intermediate, open and closed positions. U.S. Pat. No. 5,176,544 to AbuJudom et al. (1993) disclosed an actuator having two shape memory elements to control the position of a damper plate. The shape memory elements were shaped as coil springs. One shape memory element moved the damper to an open position, and another shape memory element moved the damper to a closed position.

U.S. Pat. No. 5,445,077 to Dupuy et al. (1995) disclosed a SMA for providing a lock to prevent accidental discharge of a munition. Environmental heating around the munition activated the SMA to operate a munition lock.

U.S. Pat. No. 5,405,337 to Maynard (1995) disclosed a flexible film having SMA actuator elements positioned around a flexible base element. A flexible polyimide film provided the foundation for the SMA actuator elements. Switches were attached with each SMA actuator element, and a microprocessor controller selectively operated the switches and SMA actuator elements to guide the deformation of the base element. U.S. Pat. No. 5,556,370 to Maynard (1996) disclosed an actuator formed with a negative coefficient of expansion material for manipulating a joint. SMA actuators were coiled around a joint to provide three dimensional movement of the joint.

SMAs are limited due to certain operating characteristics. The operable speed of SMAs is limited by the cooling rate of the elements. After the heat source is removed by disconnecting the electrical current or by removing the heat source, the SMA cools through convection or conduction. High temperatures downhole in a well would limit the return of an SMA to the martensitic state. Bias spring actuators do not inherently have two stable positions, and the work output for SMAs per unit volume significantly decreases if the SMAs are used in a bending application. Internally heated SMAs are limited to relatively small cross sections because the current requirements increase with larger cross sectional area. SMA applications are limited by the range of deflection, the deflection of the SMA in a single direction, power requirements, the environmental operating temperatures, and the time required for operation of the SMA.

Conventional downhole locomotion techniques require surface operation of wirelines or tubing, or downhole tractors powered from the surface as described above. Deviated and multilateral wellbore configurations and high operating temperatures challenge conventional techniques for moving a tool downhole in a well. Accordingly, a need exists for improved downhole tools operable within narrow boreholes. Such tools should be compact, inexpensive, and reliable.

SUMMARY OF THE INVENTION

The present invention provides an apparatus and method for transporting an object relative to a borehole. The apparatus comprises an actuator and a phase change member engaged with the object. The phase change member is activatable by the actuator to move from an initial position into an operating position in contact with the borehole. In one embodiment of the invention, the phase change member is activatable to transport the object relative to the borehole. In another embodiment of the invention, an actuator is activatable to transport the object relative to the borehole. In different embodiments of the invention, the phase change member can comprise a shape memory alloy activatable with heat. The phase change member can return to the initial position when the actuator is deactivated, or can be urged toward the initial position with a return means such as a spring.

The method of the invention is practiced by positioning the object at a selected position downhole in the borehole, and of activating the phase change member to move the phase change member from an initial position to an operating position in contact with the borehole. The phase change member can be further activated to transport the object relative to the borehole, and can be deactivated to return the phase change member to the initial position.

BRIEF DESCRIPTION OF THE DRAWINGS

FIG. 4 shows details of the relationship between a phase change member and the extendible arm.

FIG. 7 illustrates longitudinal movement of the housing as the phase change member is activated.

DESCRIPTION OF THE PREFERRED EMBODIMENTS

The invention provides an apparatus and method for moving and for transporting downhole tools and other objects with a phase change material such as a shape memory alloy. The invention is particularly suited for downhole tools in slender boreholes such as slimholes, in highly deviated wells, and in the connections between multilateral wells. As used herein, the term "tool" or "object" includes pipe, casing, tubing, perforating guns, logging equipment, "fishing" devices, packers, bridge plugs, and other components placed downhole in boreholes during the drilling, completion and workover of hydrocarbon producing wells and other boreholes.

Figure 1:
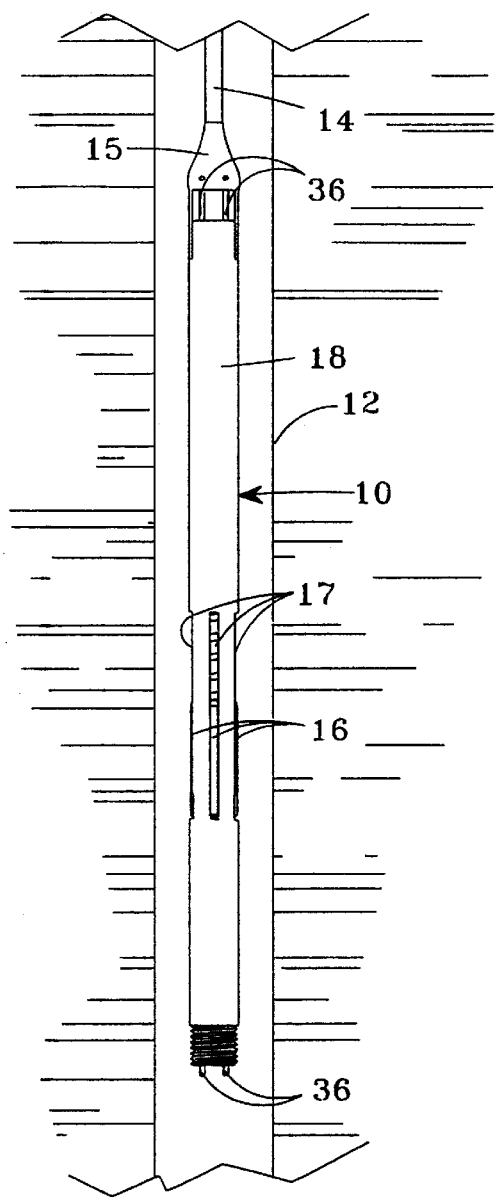
FIG. 1 illustrates one embodiment of a tool having arms in an initial retracted position for entry into a borehole.

Referring to FIG. 1, downhole tool 10 is positioned within borehole 12. Tool 10 can be lowered into borehole with a tubing element or cable identified as slickline 14. Cablehead 15 connects tool 10 to slickline 14. Slickline 14 can also comprise tubing elements such as coiled tubing and other tubular members. One or more extendible arms 16 are extendible through slots 17 and are pivotable relative to tool housing 18. Within housing 18, arms 16 are attached to sled body 19 which is slidable relative to housing 18. As shown in FIG. 1, arms 16 are run into borehole 12 in an initial, retracted position to present a minimal cross-section for tool 10. This retracted configuration reduces tool sticking as tool 10 is run into borehole 12, particularly in areas where borehole 12 has a tight turning radius or where multiple boreholes connect.

Figure 2:
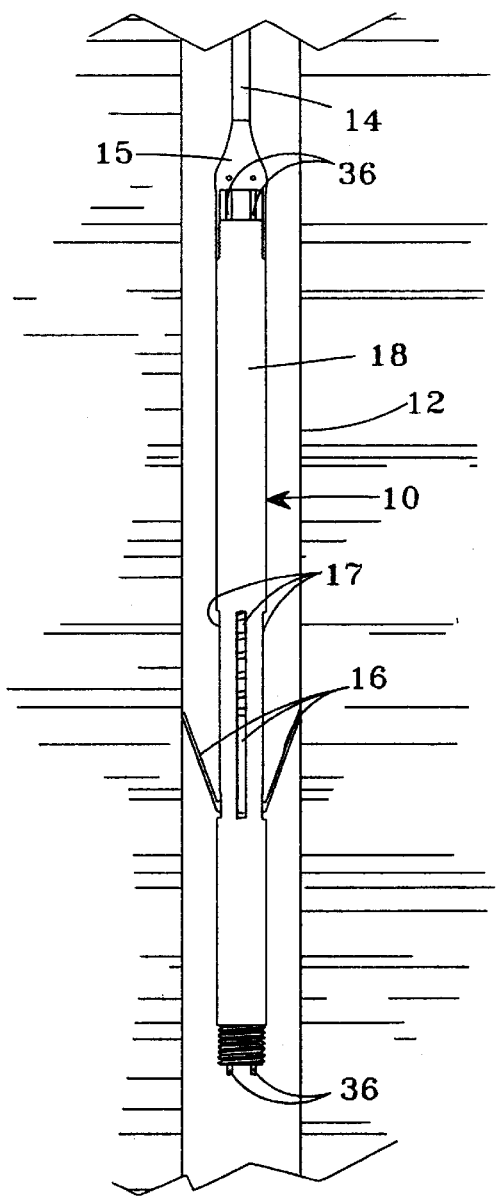
FIG. 2 illustrates the tool after the arms have been extended to contact the borehole wall.
Figure 3:
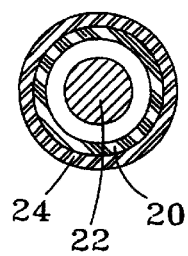
FIG. 3 shows a crossectional view of a phase change material, heater and insulation.

FIG. 2 illustrates the invention after tool 10 has been activated to extend arms 16. Phase change member 20, formed with a phase change material such as a shape memory alloy ("SMA") as shown in FIGS. 3 and 4, is positioned within housing 18 and is selectively heated with internal heater 22 as shown in FIG. 3. Heater 22 cancomprise an electrical circuit which passes electric current through SMA 20 and heats SMA 20 with resistance heating. Alternatively, heater 22 can comprise a free standing heating element for heating SMA 20 through conduction, convection, radiation, or a combination of these techniques. In other embodiments of the invention wherein the phase change material is activated by other means, heater 22 is replaced with the other means as appropriate. Insulation jacket 24 is positioned on the outside of SMA 20 to reduce thermal losses and to control the temperature of SMA 20.

Figure 5:
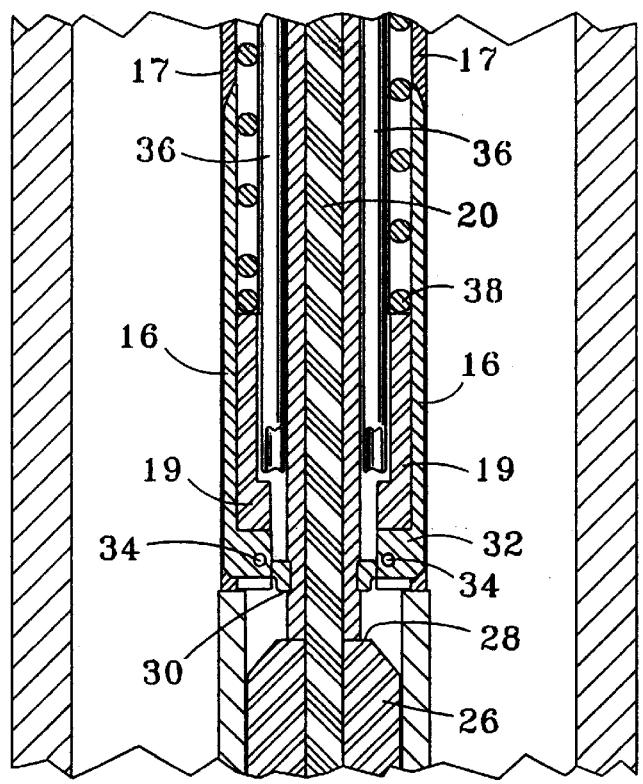
FIG. 5 illustrates the position of a locking dog and locking slot when the arms are retracted.
Figure 6:
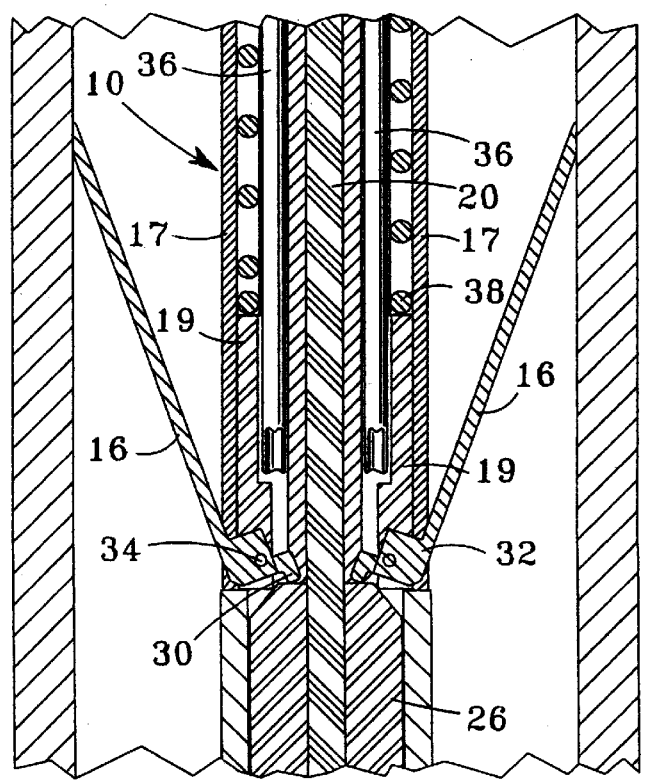
FIG. 6 illustrates the position of the arms in an extended position.

As shown in FIG. 4, SMA 20 is attached to load transfer sleeve 26 with section end 27 which pushes against sleeve 26. As SMA 20 shrinks in length, section end 27 pushes against sleeve 26 to move sleeve 26 axially upward within housing 18. Shrinkage of SMA 20 moves sleeve shoulder 28 into contact with contact ends 30 of cams 32 as shown in FIGS. 5 and 6. Each cam 32 is rotatable about a pivot 34 and is connected to an arm 16 or other extension member for extending the extendible reach of cam 32. Arm 16 serves as an extension member mechanically engaged with phase change member 20 for extending the movement of phase change member 20. Although arm 16 is illustrated as a mechanical bar, an extension member could comprise different physical structures such as a block and tackle, a combination of gears, rack and pinion drives, screw threaded jacks, or a combination of mechanical devices for extending the movement range or force exerted by phase change member or SMA 20. Although a simple rotatable arm 16 is illustrated as comprising a representative expansion member, various mechanical devices and structures can provide the extension functions of extending the reach for engaging phase change member 20 with borehole 12, or of lengthening the travel distance or other movement of housing 18 relative to borehole 12.

The initial shortening of SMA 20 causes sleeve shoulder 28 to touch contact ends 30. Continued shortening of SMA 20 rotates cam 32 to move arms 16 into contact with borehole 12, and this movement fixes arms 16 and sled body 19 relative to borehole 12. After this position is fixed, continued shortening of SMA 20 causes the upper end of SMA 20 and cablehead 15 to move downwardly within borehole 12, thereby translating housing 18 downwardly (in an axial direction) relative to arms 16. Slots 17 within housing 18 facilitate such relative movement. After full movement of housing 18 has been accomplished, SMA 20 is deactivated to return SMA 20 and spring 38 to the original orientation relative to housing 18.

Through-bus tube 36 extends through an interior space within tool 10 as shown in FIGS. 5 and 6 to permit the insertion of wire, hydraulic lines or other structures (not shown) through tool 10. Static seals (not shown) at either end of tube 36 prevent the intrusion of fluids into the interior of tool 10. Notably, all of the working elements of tool 10 can be sealed with static seals instead of dynamic seals found in conventional tools. The elimination of dynamic seals significantly improves tool reliability by avoiding failures associated with dynamic seals.

As used herein, the term "phase change material" means any material or structure capable of initiating movement in a member. Phase change materials such as SMAs are activated with different techniques which can include heat, chemical processes, or magnetic or mechanical movements. As used herein, the terms "activate" and "activatable" encompass different features which can include motion or a reaction caused by heat, chemical processes, magnetics, or mechanical movements.

The invention uses a phase change material such as an SMA to transport a housing relative to borehole 12. Although a preferred embodiment of the invention uses an SMA as the phase change material, other compositions and materials can be used to accomplish the functional result of actuating a downhole tool. The invention can orient or position downhole tool 10 within borehole 12, can rotate or translate or shift tool 10 relative to borehole 12, or can move one component of tool 10 relative to another component of tool 10.

The properties of SMAs can be utilized to accomplish different functional results. A change of state in SMAs also changes the geometry and stress/strain relationships of the material or alloy. Such changes can cause relative motion of tool components and can actuate the tool to perform a selected task. The SMAs are made of the same alloy so that they have essentially the same hysteresis and phase characteristics. The properties of the shape memory alloy will relate to the activation temperature, to the hysteresis between phases, and to the initial and final temperatures.

For a TiNi shape memory alloy, the activation temperature can range between minus and positive one hundred degrees C. Other shape memory alloys have demonstrated higher activation temperatures. Because the phase transition temperature of a SMA is constant, the resistance of each SMA is directly related to the angular displacement. For a 10 inch SMA tube, a four percent shortening would leave a final length of 9.6 inches. One SMA configuration having a 4000 pounds of force capability incorporates a central cartridge heater inside a frame having six aluminum spokes. A total of 170 wires are wound on each of the spokes, and such SMA is capable of shortening 0.140 inch from a total SMA length of 3.5 inches.

FIGS. 7 and 4 comparatively illustrate the operation of one embodiment of the invention adapted to transport tool 10 longitudinally within a substantially cylindrical borehole 12. After SMA 20 has been heated to expand arms 16 outwardly into contact with the wall of borehole 12, continued heating of SMA 20 continues shortening of SMA 20, thereby translating housing 18 relative to borehole 12 over the distance identified as $d_i$. Subsequently, SMA 20 can be deactivated to return to return bias spring 38 to the initial orientation, and the cycle can be repeated. The weight of slickline 14 and housing 18 prevent reverse movement of tool 10 as SMA 20 and spring 38 return to the initial orientation within housing 18. Subsequently, SMA 20 can be activated to repeat the process.

Multiple SMAs 20 can be incorporated into a single tool 10 to enhance the movement rate of housing 18, or to increase the motive force exerted on housing 18. Multiple SMAs 20 can be operated in parallel, in overlapping sequence, or in series to provide for continual movement as one or another SMA is deactivated to return to the individual, initial orientation. Whereas a single SMA 20 may accomplish a translation rate of one foot per minute within borehole 12, a combination of multiple SMAs may accomplish travel rates four or more times greater. SMAs can be oriented in opposite directions to provide for opposing translational movement within a cylindrical borehole. Alternatively, SMAs can be oriented in different directions, or mechanically connected in different ways, to provide different movements for tool 10.

The invention replaces motorized devices, thereby reducing the actuation lengths and weights by over fifty percent. This capability provided by the invention permits operation of the invention in certain slimholes and highly deviated wells inaccessible to conventional tools. By reducing the length requirements for each tool, more tools can be run within a single tool string. The ability to reliably extend and retract standoffs permits the tools to be run within the borehole in a closed position, and opened only within the region of investigation.

The construction of the invention has fewer components than downhole tractors and significantly simplifies the manufacture and operation of downhole locomotive tools. Dynamic seals are eliminated, thereby eliminating failures caused by dynamic seals. The invention permits the actuating means to return to the original, unpowered position and facilitates subsequent operation of the tool through the work cycle.

In addition to the logging tool described herein, the invention is applicable to retractable standoffs in acoustic and other tools, and can center a tool or provide a lesser radial displacement away from the borehole wall. The invention reduces the possibility of binding within a borehole, therefore reducing the need to run the tool slick. This feature of the invention significantly improves the quality of borehole data by eliminating the need for lubricating fluid as the tool is run in the borehole. Additionally, the invention requires minimal space which facilitates the placement of through-bus communication wires through the tool. Although the invention is useful in the locomotion of downhole tools through a borehole, the invention is also useful to pull liners, tubing or pipe through a borehole during the installation or replacement of such tubular members.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus for transporting an object in a borehole having an axis in an axial direction, comprising:

an actuator; and
   a phase change member engaged with the object in an initial position, wherein said phase change member is activatable by said actuator to move into an operating position for engaging the borehole and for moving the object along the axial direction.

2. An apparatus as recited in claim 1, further comprising an extension engaged with said phase change member for extending the movement of said phase change member.

3. An apparatus as recited in claim 2, wherein said extension is positioned between said phase change member and the borehole.

4. An apparatus as recited in claim 1, further comprising a mechanism engaged with the object for moving the object relative to the borehole after said phase change member engages the borehole.

5. An apparatus as recited in claim 1, wherein said phase change member comprises a shape memory alloy.

6. An apparatus as recited in claim 5, wherein said phase change member is further activatable by said actuator to permit movement of said phase change member from said operating position to said initial position.

7. An apparatus as recited in claim 6, wherein said phase change member is capable of moving from said operating position to said initial position when said actuator is deactivated.

8. An apparatus as recited in claim 6, further comprising a return means engaged with said phase change member for returning said phase change material from said operating position to said initial position.

9. An apparatus as recited in claim 1, wherein the borehole is substantially cylindrical, and wherein said phase change member is capable of moving the object longitudinally within the cylindrical borehole.

10. An apparatus as recited in claim 1, wherein said phase change member is deactivatable to move said phase change member to said initial position relative to the object, and further comprising a second phase change member engaged with said actuator for moving the object relative to the borehole when the other phase change member is deactivated.

11. An apparatus for engaging an object with a borehole wall downhole in the borehole, comprising:

a housing;
   a phase change member engaged with said housing in an initial position, wherein said phase change member is activatable to move from said initial position to an operating position;
   an extension engaged with said phase change member for contacting the borehole wall upon activation of said phase change member;
   an actuator for activating said phase change member to move said extension into contact with the borehole wall wherein activation of said phase change member is capable of transporting said housing longitudinally relative to the borehole.

12. An apparatus as recited in claim 11, wherein said actuator is capable of activating said phase change member to transport said housing relative to the borehole.

13. An apparatus as recited in claim 12, wherein the borehole is substantially cylindrical.

14. A method for transporting an object in a borehole having an axis along the axial direction, the method comprising:

positioning the object at a preselected position downhole in the borehole, wherein the object is engaged with a phase change member;
   activating said phase change member to move said phase change member from an initial position relative to the object to an operating position in contact with the borehole; and
   activating said phase change member to transport the object in the axial direction.

15. A method as recited in claim 14, further comprising the step of deactivating said phase change member to remove said phase change member from contact with the borehole.

16. A method as recited in claim 15, further comprising the step of deactivating said phase change member to return said phase change member to said initial position relative to the object.

17. A method as recited in claim 14, further comprising the step of operating an actuator to transport the object relative to the borehole after said phase change member has been activated into said operating position in contact with the borehole.

18. A method as recited in claim 14, wherein said phase change member comprises a shape memory alloy, further comprising the step of operating an actuator engaged with said shape memory alloy to selectively heat said shape memory alloy.

* * * * *

UNITED STATES PATENT AND TRADEMARK OFFICE
CERTIFICATE OF CORRECTION

PATENT NO : 6,062,315
DATED : May 16, 2000
INVENTOR(S) : Paul A. Reinhardt

It is certified that error appears in the above-identified patent and that said Letters Patent are hereby corrected as shown below:

Please add "Assignee Name" -- Baker Hughes Incorporated --, and

"Residence" -- Houston, Texas --

Signed and Sealed this

Eighth Day of May, 2001

*Attest:*

NICHOLAS P. GODICI

*Attesting Officer*  Acting Director of the United States Patent and Trademark Office